(No Model.)
C. SCHON & C. S. BROWN.
INDICATOR FOR HYDRAULIC ELEVATORS.
No. 268,946. Patented Dec. 12, 1882.
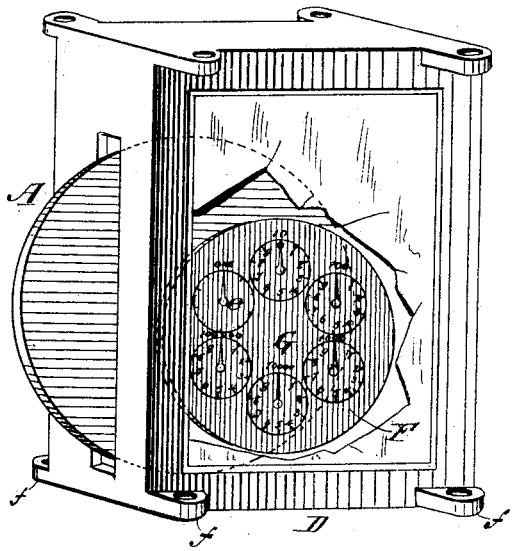
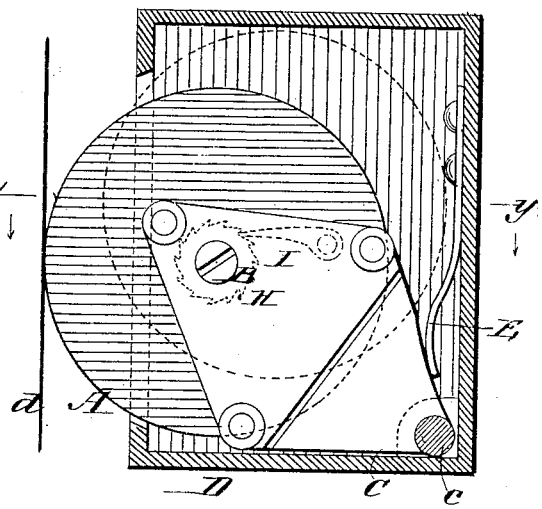
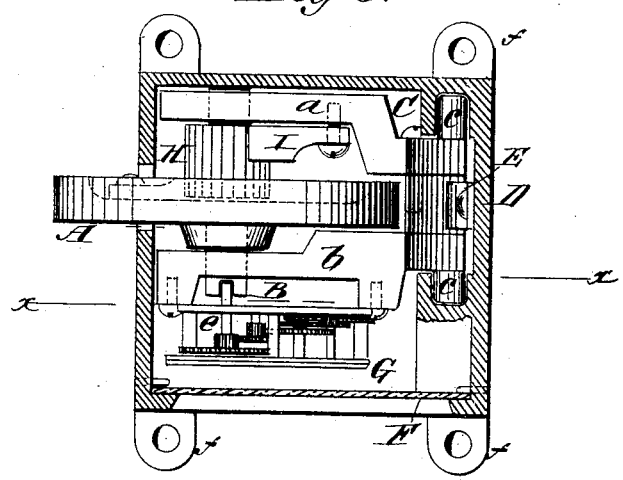
WITNESSES:
Francis McArdle.
C. Sedgwick
INVENTOR:
C. Schon
C. S. Brown
BY Munn & Co.
ATTORNEYS.

UNITED STATES PATENT OFFICE.

CARL SCHON AND CALVIN S. BROWN, OF TOLEDO, OHIO.

INDICATOR FOR HYDRAULIC ELEVATORS.

SPECIFICATION forming part of Letters Patent No. 268,946, dated December 12, 1882.

Application filed July 8, 1882. (No model.)

*To all whom it may concern:*

Be it known that we, CARL SCHON and CALVIN S. BROWN, of Toledo, in the county of Lucas and State of Ohio, have invented a new and Improved Indicator for Hydraulic Elevators, of which the following is a full, clear, and exact description.

Our invention consists of a roller to bear against and run along the elevator-post or guideway, and recording mechanism to be turned by the roller, arranged in a case to be attached to the elevator-carriage, so as to be operated, when said carriage ascends, to show the number of feet the piston travels by the water-pressure, and thereby make a record by which the number of gallons used can be ascertained, all as hereinafter fully described.

Reference is to be had to the accompanying drawings, forming part of this specification, in which similar letters of reference indicate corresponding parts in all the figures.

Figure 1 is a perspective view of our improved indicator with the glass front broken out. Fig. 2 is a sectional elevation taken on line $x\ x$, Fig. 3. Fig. 3 is a horizontal section on line $y\ y$, Fig. 2.

A represents a wheel or roller of suitable size, which is mounted on pivot B in suitable housings, $a\ b$, pivoted at $c$ in the angle of a suitable box or case, D, out of which the wheel projects through a slot in one side, suitably for bearing and rolling upon the surface $d$ of the post or guideway along which the elevator-carriage runs. The housings $a\ b$ are capable of rising and falling a little on their pivots $c$ to allow the wheel to follow the surface $d$ in case it may deviate a little from a straight course. The pivots $c$ are located beyond the pivot B, so that the wheel will gravitate to the surface $d$, and to insure the requisite pressure of the wheel on the post a spring, E, is arranged in the case to press the wheel against the post.

The pivot B has a ratchet, H, with which a pawl, I, engages to lock the wheel and prevent it from turning backward when the carriage descends, and thus prevent reversing the register. The pivot B has a nick in one end, in which the unit-stud of a register couples for working the register by the wheel A.

G is the dial of the register, and F a glass side to the case, through which the record of the dial may be seen.

The case is provided with perforated lugs $f$, by which it may be attached either to the top or bottom of the elevator-carriage, as may be preferred.

Having thus fully described our invention, we claim as new and desire to secure by Letters Patent—

1. The combination of the wheel A, pivot B, housings $a\ b$, pivots $c$, and case D, said case having lugs $f$ for attaching it to the top or bottom of an elevator-carriage, and wheel A, projecting through a slot in the side of the case, substantially as described.

2. The combination of spring E with the housings $a\ b$, pivoted in case D at $c$, and having wheel A pivoted in them, and arranged to swing to and from guideway $d$ on pivots $c$, substantially as described.

CARL SCHON.
CALVIN S. BROWN.

Witnesses:
H. A. CHAMBERLIN,
H. E. BRUKSEKER,
F. P. BECKWITH.